Aug. 30, 1949.　　　　E. N. GILBERT　　　　2,480,186
ANTENNA
Filed Oct. 10, 1945
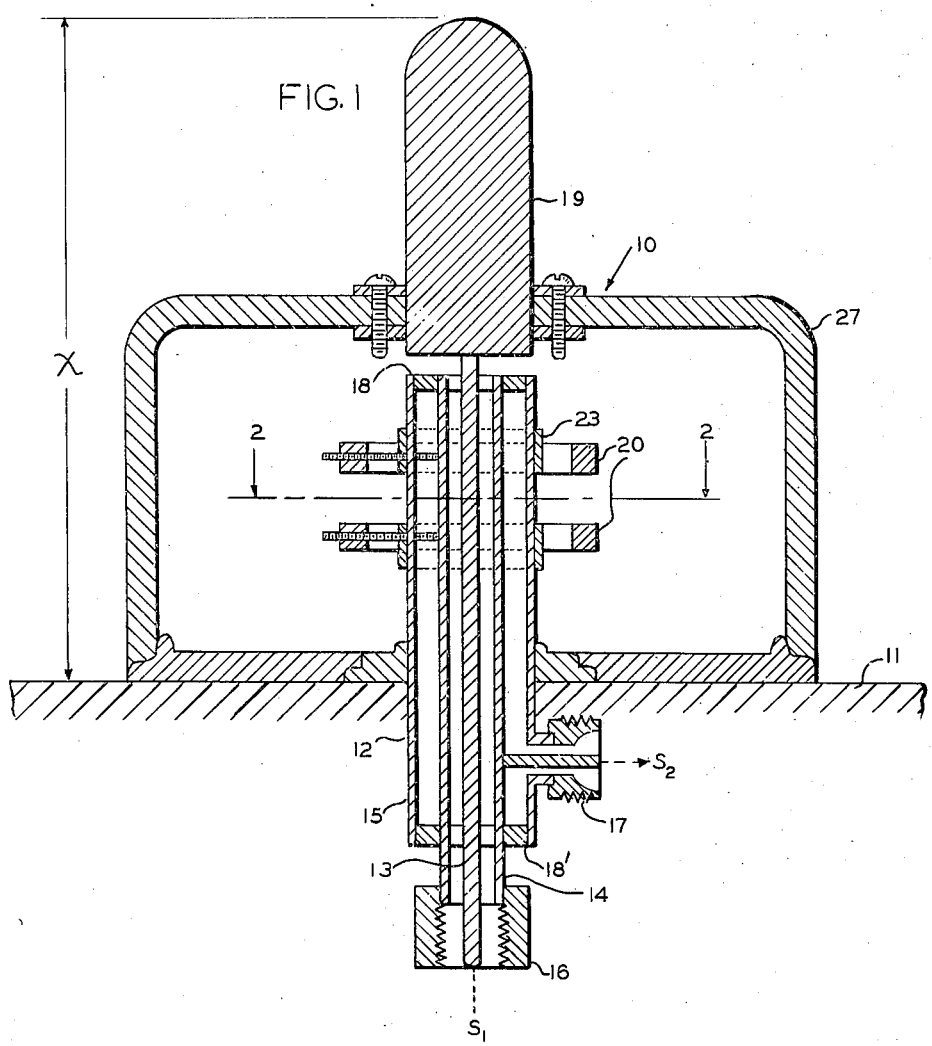
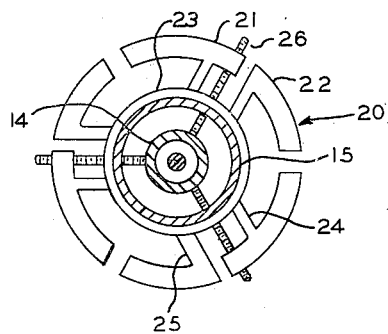
*INVENTOR.*
EDGAR N. GILBERT
BY
*William D. Hall.*
ATTORNEY Patented Aug. 30, 1949

2,480,186

UNITED STATES PATENT OFFICE 2,480,186

ANTENNA

Edgar N. Gilbert, Cambridge, Mass., assignor, by mesne assignments, to the United States of America as represented by the Secretary of War Application October 10, 1945, Serial No. 621,570

3 Claims. (Cl. 250—33)

This invention relates to antennas for communication systems and more particularly to an antenna for use as a beacon.

In certain radio object locating systems such as are used for the searching and tracking of targets it is desirable to utilize a "friend or foe interrogation" (IFF) to facilitate recognition of targets such as aircraft or ships and that the IFF cooperate with the beason or target searching and tracking system particularly for early warning of approaching targets. Heretofore one antenna has been utilized for searching and tracking, such as by scanning a particular sector in space, as a beacon to respond to searching and tracking signals from a distant set while a separate antenna has been required for the IFF interrogation or to give an IFF response. For airborne use it is desirable that the equipment be reduced to a minimum, that such equipment be compact to save space, be of lightweight construction and also be adapted to conform with the streamlining of the aircraft. This may be achieved in accordance with one of the objects of the present invention by utilizing a single antenna adapted to operate at two different frequencies of electromagnetic energy, such as at microwave frequencies having wavelengths of the order of centimeters for the target locating function, and at longer wave frequencies for the IFF.

Another object of the invention is to provide an antenna adapted to transmit and receive two different signals of electromagnetic wave energy in such a way that neither interferes with the other.

It is still another object of the invention to provide an antenna with radiating elements adapted to be excited separately from two different sources simultaneously.

It is a further object of the invention to provide a dual-frequency antenna characterized by being of compact and light-weight construction.

For a better understanding of the invention, together with other and further objects and advantages thereof, reference is had to the following description, taken in connection with the accompanying drawings, in which:

Fig. 1 is a longitudinal sectional view of the antenna according to the present invention, and Fig. 2 is a completed sectional view taken on the line 2—2 of Fig. 1.

In the drawings, 10 designates the antenna, according to the present invention, supported upon a base 11 which may be, for example, the outer surface or skin structure of an aircraft.

Energy for exciting antenna 10 is fed thereto by means of a double coaxial conductor transmission line 12. Transmission line 12 comprises a central solid conductor 13, a spaced concentric conductor 14 of substantially circular cross-section and a second spaced outer conductor 15 of substantially circular cross-section concentric with conductors 13 and 14.

The inner coaxial line comprising conductors 13 and 14 is electrically connected to a source of excitation indicated by $S_1$. For example the inner coaxial line may be coupled to a transmission line connecting to a transmitting apparatus by means of coupling member 16 at one end of the inner coaxial line. The outer coaxial line comprising conductors 14 and 15 may be electrically connected to a second source of excitation $S_2$ in any suitable manner such as by coupling member 17 which may be a coaxial conducting cable, the outer conductor of which is electrically connected to the other conductor 15 of transmission line 12 and the inner conductor of which is connected or coupled to the conductor 14. The outer coaxial line comprising conductors 14 and 15 is closed at both ends by means of annular plates or discs 18 and 18' of electrically conductive material to complete the electric path for energy currents fed thereto from source $S_2$.

Inner conductor 13 extends outwardly beyond transmission line 12 and terminates in a radiating element 19 which is a solid probe-like conductor structure preferably streamlined or tear-drop in shape but which may also be cylindrical and of larger diameter than, and concentric or coaxial with, inner conductor 13 which serves to excite radiating element 19. If desired radiating element 19 may be rounded at its free end to reduce wind-drag effect.

Mounted around the outside surface of outer conductor 15 is at least one, and preferably two spaced one-half wavelength apart, radiating element 20 which is coupled to, and adapted to be excited by, energy fed thereto by the outer coaxial line comprising conductors 14 and 15. Radiating elements 20 preferably are of the dipole type such as disclosed in the copending applications of Henry J. Riblet, Serial No. 532,793, filed April 26, 1944, of Louise Buchwalter and George G. Harvey, Serial No. 540,570, filed June 16, 1944, or of George A. Jarvis, Serial No. 613,602, filed August 30, 1945. As shown in Fig. 2 dipole radiating element 20 is similar to that disclosed in the aforementioned copending application of Buchwalter and Harvey and comprises a triple dipole radiator with the dipoles arranged in a horizontal plane and each dipole comprising two dipole sections 21 and 22. Each dipole is supported on an annular collar 23 by means of spaced supporting members 24 and 25. Collar 23 is mounted on, and in initimate contact with, outer conductor 15 of transmission line 12. Each of the dipole sections, 21, is excited by means of a probe 26 which is connected at its inner end to conductor 14, passes through suitable apertures in conductor 15 and collar 23 and is connected to dipole section 21, thus serving to excite the dipole. As shown the dipole sections are equally spaced about collar 23 and are preferably curved so that their configuration on a horizontal plane substantially defines a circle.

Dipole radiating elements 20 preferably are adapted to be fed in phase by the outer coaxial line of transmission line 12 to give an omnidirectional broad side radiation pattern with horizontal polarization as in a conventional beacon type antenna, the feed energy from the energy source $S_2$, preferably being in microwave range of frequencies (e. g. having wavelengths of the order of centimeters). Thus the dipole radiating elements 20 are adapted to transmit and receive energy within the microwave range of frequencies for the beacon or the searching and tracking function of the antenna.

The radiating element 19 including the length of coaxial line 12 is adapted to transmit and receive energy within an energy range of longer wavelengths (such as of the order of meters) for the IFF interrogation. The energy currents for exciting radiating element 19 are fed thereto from source $S_1$, a portion of the energy currents being transmitted directly to radiating element 19 by means of inner conductor 15 while the other portion of the currents passes along the inner skin surface of conductor 14, through the opening in plate or disc 18, then along the outer skin surface of conductor 15 to the surface of base 11. Thus radiating element 19 and surface 11 comprises in effect a dipole radiating element, since the base 11 acts as a ground. To obtain effective operation of the longer wave dipole radiating element comprising element 19, the length of coaxial line 12 and base 11, the distance $x$ from the surface of base 11 to the free end of element 19 is preferably a quarter of a wavelength at the frequency of operation of energy source $S_1$.

A streamlined housing 27 may if desired be mounted to surround the antenna 10 for protection of the antenna from weather and, if desired, to enable the antenna 10 to be pressurized. Thus housing 27 may be streamlined, tear-drop or oval in shape or as a hollow cylinder mounted on the base 11 and secured thereto in any desired manner. Preferably radiating element 19 projects beyond, and extends through, a suitable aperture in housing 27.

It will be understood that even when excitation of the radiating elements 19 and 20 at two different frequencies exists simultaneously on the same surfaces of transmission line 12, they do not interfere with each other. Preferably the radiating elements 19 and 20 are so constructed that they are susceptible of operation only within their respective range of frequencies, that is the respective radiating elements are made resonant to their respective frequencies of operation.

It will be apparent that antenna 10 according to the invention as herein described is a compact and unitary structure adapted to transmit and receive energy at two different frequencies simultaneously. It is therefore possible for the antenna 10 to simultaneously act as a beacon and to obtain "friend or foe" identification.

While there has been described what is at present considered the preferred embodiment of the invention, it will be obvious to those skilled in the art that various changes and modifications may be made therein without departing from the invention.

What is claimed is:

1. An antenna for radiating electromagnetic energy of two different frequencies simultaneously comprising, in combination, a double coaxial conductor transmission line comprising an inner coaxial line constituted by a solid central conductor surrounded concentrically by a spaced conductor of substantially circular cross-section and an outer coaxial line constituted by said spaced conductor and an outer conductor of substantially circular cross-section spaced from, and surrounding concentrically said spaced conductor, means connecting said spaced conductor and said outer conductor at at least one end thereof, means electrically connecting said inner and outer coaxial lines respectively to a first and a second source of electromagnetic energy, said two sources operating at two different frequencies, two dipole radiating elements disposed intermediate the length of said transmission line end spaced apart by substantially one-half wavelength at the operating frequency of said second energy source, each of said elements comprising three dipoles equally spaced around said transmission line in a plane substantially perpendicular to the axis of said transmission line, each of said dipoles having two dipole sections, the configuration of said sections in said plane perpendicular to said transmission line substantially defining a circle concentric with said outer conductor, means supporting each of said dipoles and electrically connecting each of said dipoles to said outer conductor, means coupling each of said dipoles to said spaced conductor whereby said dipoles are excited by energy within the microwave range of frequencies from said second source, and radiating means coupled to said inner coaxial line and a supporting base.

2. An antenna for simultaneously radiating electromagnetic energy of two different frequencies from a first and a second energy source respectively comprising in combination, a supporting base, a double coaxial conductor transmission line comprising an inner coaxial line constituted by a central conductor surrounded concentrically by an intermediate conductor, and an outer coaxial line constituted by said intermediate conductor and an outer conductor surrounding concentrically said intermediate conductor, said transmission line extending through an opening in said base in a direction perpendicular to said base for a distance less than a quarter wavelength at the operating frequency of said first energy source, said outer conductor of said transmission line making electrical contact with said base at the point said transmission line passes therethrough, means electrically connecting said intermediate conductor and said outer conductor at at least one end thereof, means electrically connecting said inner and outer coaxial lines respectively to said first and second energy sources, at least one dipole radiating element disposed intermediate the end of said transmission line and said base, said dipole element comprising at least two dipole elements equally spaced around said transmission line in a plane parallel to said base, each of said dipoles having two poles, the configuration of said poles in said planes parallel to said base substantially defining a circle concentric with said outer conductor, means supporting each of said dipoles on said outer conductor, means for coupling each of said dipoles to said intermediate conductor whereby said dipoles are excited by energy from said second source, a solid probe like conducting member electrically connected to, and supported on, one end of said central conductor the distance between the free end of said memmer and the surface of said base being a quarter wavelength at the operating frequency of said first energy source.

3. An antenna as claimed in claim 2 wherein there are a plurality of said dipole elements disposed intermediate the end of said transmission line and said base said dipole elements being spaced apart along said transmission line by distances equal to one half a wavelength at the operating frequency of said second energy source.

EDGAR N. GILBERT.

REFERENCES CITED

The following references are of record in the file of this patent:

UNITED STATES PATENTS

| Number | Name | Date |
| --- | --- | --- |
| 2,168,860 | Berndt | Aug. 8, 1939 |
| 2,184,729 | Bailey | Dec. 26, 1939 |
| 2,251,530 | Thorene | Aug. 5, 1941 |
| 2,251,997 | Goldmann | Aug. 12, 1941 |
| 2,267,951 | Roosenstein | Dec. 30, 1941 |
| 2,292,791 | Mims | Aug. 11, 1942 |
| 2,393,218 | Caraway | Jan. 13, 1946 |
| 2,413,085 | Tiley | Dec. 24, 1946 |
| 2,417,052 | Benioff | Mar. 11, 1947 |
| 2,426,633 | Mason | Sept. 2, 1947 |